US009957160B2

(12) United States Patent
Kutschera et al.

(10) Patent No.: US 9,957,160 B2
(45) Date of Patent: May 1, 2018

(54) PROCESS FOR SUBSEQUENT SURFACE MODIFICATION OF FINELY STRUCTURED STRUCTURES

(71) Applicant: BASF SE, Ludwigshafen (DE)

(72) Inventors: Michael Kutschera, Neustadt (DE); Johann Martin Szeifert, Mannheim (DE); Zhizhong Cai, Limburgerhof (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days. days.

(21) Appl. No.: 14/172,078

(22) Filed: Feb. 4, 2014

(65) Prior Publication Data

US 2014/0342143 A1     Nov. 20, 2014

Related U.S. Application Data

(60) Provisional application No. 61/760,678, filed on Feb. 5, 2013.

(51) Int. Cl.
*B05D 7/00* (2006.01)
*B82Y 40/00* (2011.01)
*B82Y 30/00* (2011.01)

(52) U.S. Cl.
CPC .............. *B82Y 40/00* (2013.01); *B82Y 30/00* (2013.01); *Y10T 428/298* (2015.01); *Y10T 428/2982* (2015.01)

(58) Field of Classification Search
CPC ...................................................... C07F 7/28
See application file for complete search history.

(56) References Cited

U.S. PATENT DOCUMENTS

| 5,738,801 A | 4/1998 | Ziegler et al. |
| 6,516,537 B1 | 2/2003 | Teich et al. |
| 2007/0003463 A1 | 1/2007 | Ajiri |
| 2007/0178235 A1* | 8/2007 | Yamada et al. .......... 427/255.33 |

FOREIGN PATENT DOCUMENTS

| DE | 198 10 565 A1 | 9/1999 |
| JP | 2009 107857 A | 5/2009 |
| WO | WO-95/06617 A1 | 3/1995 |

(Continued)

OTHER PUBLICATIONS

Kwak, Superhydrophobic ZnO Nanowire Surface: Chemical Modification and Effects of UV Irradiation, J. Phys. Chem. 2009, 113, p. 12085-12089.*

(Continued)

*Primary Examiner* — Tabatha Penny
(74) *Attorney, Agent, or Firm* — Drinker Biddle & Reath LLP

(57) ABSTRACT

A process for subsequent surface modification of finely structured structures formed from hard inorganic materials, and the structures obtainable by this process as such. The structure has, in at least one spatial direction, a material thickness M of not more than 1000 nm and as an overall structure having, in at least one spatial direction, a measurement which is at least 5 times the material thickness M. The process includes treating the structures with an organic liquid under supercritical conditions.

9 Claims, 4 Drawing Sheets

500 µm

(56) References Cited

FOREIGN PATENT DOCUMENTS

| WO | WO-01/52981 A1 | 7/2001 |
| WO | WO-03/034979 A2 | 5/2003 |
| WO | WO-2010/122049 A1 | 10/2010 |

OTHER PUBLICATIONS

Han, Opticla properties and lasing of ZnO nanoparticles synthesized continuously in supercritical fluids, Chemical Physics Letters 505 (2011), p. 51-56.*

Veriansyah, Continuous synthesis of surface-modified zinc oxide nanoparticles in supercritical methanol, J. of Supercritical Fluids 52 (2010), p. 76-83.*

Mousavand, Supercritical hydrothermal synthesis of organic-inorganic hybrid nanoparticles, J Mater Sci, 41 (2006) p. 1445-1448.*

U.S. Appl. No. 61/760,678.
U.S. Appl. No. 61/760,677.
U.S. Appl. No. 61/760,679.

Domingo, C., et al., "Grafting of Trialkoxysilane on the Surface of Nanoparticles by Conventional Wet Alcoholic and Supercritical Carbon Dioxide Deposition Methods", J. of Supercritical Fluids, vol. 37, (2006), pp. 72-86.

Ghosh, S. K., et al., "Supercritical Ethanol—A Fascinating Dispersion Medium for Silica Nanoparticles", J. Physical Chemistry B., Ed. 111, No. 28, (2007), pp. 8169-8174.

Kargin, Y. F., et al., "Interaction of Oxides with Supercritical Isopropanol", Russian Journal of Inorganic Chemistry, Ed. 48, No. 4, (2003), pp. 103-106.

Roy, C., et al., "Assessment of $scCO_2$ Techniques for Surface Modification of Micro- and Nanoparticles: Process Design Methodology Based on Solubility", The Journal of supercritical Fluids, vol. 54, (2010), pp. 362-368.

Slostowski, C., et al., "Near- and Supercritical Alcohols as Solvents and Surface Modifiers for the Continuous Synthesis of Cerium Oxide Nanoparticles", Langmuir, Ed. 28, No. 48, (2012), pp. 16656-16663.

Translation of International Preliminary Report on Patentability for PCT/EP2014/052124 dated Aug. 5, 2015.

* cited by examiner

500 μm

PROCESS FOR SUBSEQUENT SURFACE MODIFICATION OF FINELY STRUCTURED STRUCTURES

CROSS-REFERENCE TO RELATED APPLICATIONS

This application claims the benefit of U.S. Provisional Application 61/760,678, filed Feb. 5, 2013, which is incorporated herein by reference.

The present invention relates to a process for subsequent surface modification of finely structured structures formed from hard inorganic materials, and to the structures obtainable by this process as such.

Finely structured inorganic structures, i.e. structures formed from inorganic materials having spatial dimensions on the nanometer or micrometer scale, for example finely divided hollow spheres, fibers, platelets or agglomerates of primary particles having dimensions in the nanometer range, are of interest owing to their morphology, i.e. their three-dimensional structure, for numerous applications, for example as catalyst support materials, in fuel cells, as gas storage materials, for active ingredient and effect substance release, in filter systems, in the textile industry and in the electronics industry. For example, it is possible to encase molecules in hollow nanospheres or to use nanofibers as electrical conductors in molecular electronics. A further property of interest of finely structured inorganic structures is the high specific surface area thereof. This allows enhancement of interactions with the surrounding phase, such that catalysis and/or adsorption processes, for example, can run faster.

For a wide variety of different applications, it is advantageous to modify the surface of the finely structured inorganic structures with organic molecules. This allows control of the properties of the inorganic structures, for example electrical conductivity, hydrophilicity/lipophilicity, adsorption capacity or optical properties. For many applications, it is of interest to perform the modification of the inorganic structures subsequently, i.e. after the synthesis and optionally purification and/or isolation thereof.

A problem in the subsequent surface modification of the finely structured inorganic structures, however, is the mechanical instability thereof compared to "bulk" nanoparticles in the form of unstructured, mechanically robust powders. Especially the finely structured inorganic structures formed from hard inorganic materials are brittle and mechanically fragile. Conventional wet-chemical methods for surface modification frequently lead to the destruction of the finely structured inorganic structures due to the mechanical stress which occurs. This mechanical stress may be attributable to forces which occur, for example, in the course of mixing and stirring, and in vapor bubble formation and/or outgassing processes. Capillary forces can also lead to the destruction of the finely structured inorganic structures.

There is therefore a need for processes for subsequent surface modification of finely structured structures formed from hard inorganic materials, these processes being especially suitable for production of relatively large amounts of surface modified finely structured inorganic structures, and ensuring that the finely structured inorganic structures are destroyed only in a minimum proportion, if at all. The process should especially be operable in an economically viable manner.

C. Roy et al., J. of Supercritical Fluids 2010, 54, 362-368, describe the surface modification of nanoparticles such as $TiO_2$ with organic molecules in supercritical $CO_2$.

C. Domingo et al., J. of Supercritical Fluids 2006, 37, 72-86, describe the surface modification of nanoparticles such as $TiO_2$ with alkoxysilanes in alcoholic solution or in supercritical $CO_2$.

The processes for surface modification described in the prior art, however, are restricted to mechanically robust nanoparticles, which are not present in the form of mechanically fragile, hard inorganic structures.

It was an object of the present invention to provide a process which enables the subsequent surface modification of finely structured structures formed from a hard inorganic material, and ensures that the finely structured inorganic structures are destroyed only in a minimum proportion, if at all. Moreover, the process is to enable a high space-time yield, in order to enable economically viable production of relatively large amounts of surface modified finely structured inorganic structures.

It has now been found that, surprisingly, these and further objects are achieved by treating finely structured hard inorganic structures with a surface reactive substance in an organic liquid, the treatment being undertaken under conditions under which the organic liquid is under supercritical conditions, the surface-reactive substance having at least one reactive functional group selected from hydroxyl groups, especially carbon-bonded hydroxyl groups, carboxyl groups, carbonate groups, and oxygen atoms bonded to phosphorus atoms.

The invention therefore relates to a process for subsequent surface modification of finely structured structures formed from a hard inorganic material, comprising the treatment of the finely structured structures with an organic liquid comprising at least one reactive substance which can react with atoms of the inorganic material to form a chemical bond and having at least one reactive functional group selected from hydroxyl groups, especially carbon-bonded hydroxyl groups, carboxyl groups, carbonate groups, and oxygen atoms bonded to phosphorus atoms, the treatment being effected under conditions under which the organic liquid is under supercritical conditions.

The invention is based on the phenomenon that, under supercritical conditions, i.e. under pressure and temperature conditions above the critical pressure or the critical temperature of the liquid, the phase boundaries in liquid and gaseous form of the organic liquid dissolve. In addition, diffusion in the supercritical state is strongly promoted, and so mechanical mixing is barely necessary, if at all. Furthermore, the physicochemical processes described at the outset, such as vapor bubble formation, outgassing or the occurrence of capillary forces, are reduced or avoided.

Finely structured structures are understood in accordance with the invention to mean structures which have, in at least one spatial direction, a material thickness M of not more than 1000 nm, especially in the range from 2 to 500 nm, and as an overall structure have, in at least one spatial direction, a measurement which is at least 5 times, especially at least 10 times, the material thickness M. The material thickness M may, for example, be the wall thickness of the sphere shell of a hollow sphere, the diameter of a fiber, the thickness of a platelet or the diameter of individual primary particles which form an agglomerate. The measurement of the overall structure may, for example, be the diameter of a hollow sphere, the length of a fiber, the measurement of a platelet in its greatest dimension, or the measurement of the agglomerate in its greatest extent.

The overall structure preferably has, in at least one spatial direction, a measurement in the range from 10 µm to 10 cm, more preferably in the range from 10 μm to 5 cm, most preferably in the range from 10 μm to 1 cm.

Suitable structures formed from a hard inorganic material for the subsequent surface modification are especially the structures which follow.
i. hollow spheres, the sphere shell of which has a thickness of not more than 100 nm and especially in the range from 2 to 50 nm, and where the ratio of sphere diameter to thickness of the sphere shell is at least 5, particularly at least 7, especially at least 10 and is, for example, in the range from 5 to 200, particularly in the range from 7 to 150 and especially from 10 to 100;
ii. fibers having a fiber thickness of not more than 1000 nm, particularly 50 to 500 nm, and an aspect ratio of at least 50, particularly at least 100, for example in the range from 50 to 5000, particularly in the range from 100 to 2000;
iii. platelets having a thickness of not more than 100 nm and a ratio of diameter to thickness of at least 5, particularly at least 10, for example in the range from 5 to 200, particularly in the range from 7 to 150 and especially from 10 to 100;
iv. agglomerates of particles having a mean particle diameter of not more than 100 nm, especially 2 to 80 nm, the proportion by volume of the inorganic material, based on the total volume of the agglomerate, being in the range from 1 to 20% by volume.

The finely structured structures used in the process according to the invention may be unfunctionalized, i.e. may not yet have been treated with a reactive substance, or may already be partly functionalized. Preference is given to using inorganic structures which are unfunctionalized, i.e. have less than 3% by weight, preferably less than 1% by weight or less than 0.1% by weight of reactive substance, based on the overall inorganic structure, on the surface.

The hard inorganic material of which the inorganic structures are composed generally has a Mohs hardness of greater than 4, especially a Mohs hardness in the range from 4.5 to 9, preferably in the range from 5 to 7.

The hard inorganic material is preferably selected from metal oxides and semimetal oxides.

More particularly, the hard inorganic material comprises, as a main component, i.e. in an amount of 90 to 100% by weight, based on the total weight of the hard inorganic material, at least one of the oxides from the group of silicon dioxide, zinc oxide, tin(IV) oxide, titanium(IV) oxide and aluminum oxide. More particularly, the hard inorganic material comprises, as a main component, i.e. in an amount of 90 to 100% by weight, based on the total weight of the hard inorganic material, at least one of the oxides from the group of silicon dioxide, titanium(IV) oxide and aluminum oxide or a mixture of these oxides with at least one further oxide from the group of zinc oxide and tin(IV) oxide. Specifically, the hard inorganic material comprises, as a main component, i.e. in an amount of 90 to 100% by weight, based on the total weight of the hard inorganic material, at least one oxide from the group of silicon dioxide.

Finely structured structures composed of inorganic hard materials are known in principle, for example from WO 03/034979 and WO 2010/122049, or can be produced by standard processes, for example by sol-gel processes in polyphasic systems or by sol-gel processes in conjunction with electrospinning.

According to the invention, the inorganic structure is treated with an organic liquid comprising at least one reactive substance. The organic liquid may also be the reactive substance itself. Thus, the organic liquid is the reactive substance itself or a solution of the reactive substance in an inert organic solvent. It is preferably a solution of the reactive substance in an inert organic solvent as defined below.

The reactive substance has one or more, for example 1 to 10 or 1 to 5, reactive functionalities. The reactive substance preferably has 1, 2 or 3 reactive functionalities. The reactive substance more preferably has 1 reactive functionality. Reactive functionalities are understood in the context of the invention to mean atoms and/or atom groups which can react with the atoms of the hard inorganic material to form a chemical bond. Preference is given to reactive functional groups which can react with the atoms of the hard inorganic material to form a covalent chemical bond.

According to the invention, the reactive functionalities of the reactive substance are selected from hydroxyl groups, carboxyl groups, carbonate groups, and oxygen atoms bonded to phosphorus atoms. More particularly, the reactive functionalities are selected from hydroxyl groups, preferably carbon-bonded hydroxyl groups, carboxyl groups and carbonate groups.

If the reactive substance has one reactive functionality, the reactive substance is preferably selected from
$C_1$-$C_5$-alkanols, for example methanol, ethanol, n-propanol, isopropanol, n-butanol, isobutanol, 2-butanol and tert-butanol;
$C_1$-$C_6$-alkanecarboxylic acids, for example formic acid, acetic acid, propionic acid, butyric acid and valeric acid;
and mixtures thereof.

If the reactive substance has two or more reactive functionalities, the reactive substance is preferably selected from
$C_2$-$C_6$-alkanepolycarboxylic acids, i.e. polybasic, e.g. di- or tribasic, linear or branched alkanecarboxylic acids having two to six carbon atoms. Examples are oxalic acid, malonic acid, succinic acid, glutaric acid, adipic acid and maleic acid; hydroxy-$C_2$-$C_6$-alkanemono- and -polycarboxylic acids, i.e. mono- or polybasic, e.g. mono-, di- or tribasic, linear or branched alkanecarboxylic acids having two to six carbon atoms, which have at least one hydroxyl group in addition to at least one carboxyl group. Examples are lactic acid, 2-hydroxybutanoic acid and citric acid;
$C_2$-$C_6$-alkanepolyols, e.g. di- or trihydric, linear or branched aliphatic alcohols having two to six carbon atoms. Examples are ethylene glycol, 1,2-propanediol, 1,3-propanediol, neopentyl glycol and glycerol;
$C_3$-$C_6$-cycloalkanepolyols, i.e. polyhydric, e.g. di- or trihydric, cycloaliphatic alcohols having three to six carbon atoms, such as 1,2-cyclopropanediol, 1,2-cyclopentanediol and 1,2-cyclohexanediol;
2-hydroxyphenol (catechol) and mono- and di-$C_1$-$C_4$-alkyl-2-hydroxyphenols, especially mono- and dimethyl-2-hydroxyphenols;
$C_2$-$C_4$-alkylene carbonates, i.e. cyclic esters of carbonic acid with $C_2$-$C_4$-alkanediols, e.g. ethylene carbonate (1,3-dioxolan-2-one) and propylene carbonate (4-methyl-1,3-dioxolan-2-one);
phosphates, polyphosphates, $C_1$-$C_8$-alkyl mono- and polyphosphates; and mixtures thereof.

More particularly, the reactive substance is selected from $C_1$-$C_6$-alkanols, $C_1$-$C_6$-alkanecarboxylic acids, $C_2$-$C_6$-alkanepolycarboxylic acids, $C_2$-$C_6$-alkanepolyols, $C_2$-$C_4$-alkylene carbonates and mixtures thereof.

Particularly preferred reactive substances are methanol, ethanol, isopropanol, tert-butanol, glycerol, ethylene glycol, 1,2-propanediol, 1,3-propanediol, oxalic acid, malonic acid, ethylene carbonate and mixtures thereof.

Very particularly preferred reactive substances are ethanol, isopropanol, ethylene glycol, glycerol, oxalic acid, malonic acid, ethylene carbonate and mixtures thereof.

The reactive substance is specifically selected from isopropanol, ethylene glycol, glycerol and mixtures thereof.

The concentration of the reactive substance in the organic liquid is generally selected such that the resulting mixture can be converted readily to the supercritical state.

The organic liquid preferably has a critical temperature $T_c$ in the range from 110 to 300° C.

As mentioned, the organic liquid may consist entirely of the reactive substance and is preferably a mixture of at least one reactive substance with one or more inert organic solvents.

If a mixture of the at least one reactive substance in one or more inert organic solvents is used, the concentration of the reactive substance in the organic liquid is generally in the range from 0.01 to 50% by weight, especially in the range from 0.1 to 20% by weight, based on the organic liquid. Accordingly, the reactive substance is generally used in an amount in the range from 0.01 to 50% by weight, especially in the range from 0.1 to 20% by weight, based on the organic liquid.

The proportion of the inert organic solvent in the organic liquid is generally in the range from 50 to 99.99% by weight, especially in the range from 80 to 99.9% by weight, based on the organic liquid.

Suitable inert organic solvents are preferably those organic compounds which do not have any reactive functionality as described above and which, at standard pressure, have a boiling point in the range from 10 to 100° C., especially in the range from 30 to 90° C.

Preferred inert organic solvents are selected from $C_1$-$C_4$-alkanals such as formaldehyde, acetaldehyde, propionaldehyde, butyraldehyde and isobutyraldehyde, and $C_3$-$C_4$ ketones such as acetone or methyl ethyl ketone, $C_2$-$C_8$-alkanes such as ethane, propane, butane, isobutane, pentane, isopentane, n-hexane and its isomers, n-heptane and its isomers and n-octane and its isomers, and mixtures thereof.

Particularly preferred inert organic solvents are $C_2$-$C_8$-alkanes, $C_3$-$C_4$ ketones and mixtures thereof. Most preferably, the inert organic solvent is at least one $C_2$-$C_8$-alkane.

Specifically, the inert organic solvent is selected from n-hexane, acetone and mixtures thereof. Very specifically, the inert organic solvent is n-hexane.

Preferred organic liquids are selected from $C_1$-$C_4$-alkanols, mixtures of at least two $C_1$-$C_4$-alkanols and mixtures of at least one $C_1$-$C_4$-alkanol with at least one further reactive substance selected from $C_2$-$C_6$-alkanepolyols, $C_2$-$C_4$-alkylene carbonates and $C_2$-$C_6$-alkanepolycarboxylic acids.

Preferred organic liquids are also mixtures of the aforementioned $C_1$-$C_4$-alkanols, $C_2$-$C_6$-alkanepolyols and $C_2$-$C_4$-alkylene carbonates, especially ethanol, isopropanol, ethylene glycol, glycerol or ethylene carbonate, with $C_2$-$C_8$-alkanes.

Supercritical surface modification can be undertaken in a customary manner, for example in analogy to the prior art cited at the outset.

In general, a mixture of the organic liquid comprising the reactive substance is heated with the finely structured inorganic structures, for example a suspension, under pressure to a temperature above the critical temperature.

Preferably, the procedure will be to introduce the structures under subcritical conditions into the organic liquid initially charged in a pressure vessel, for example an autoclave, and then to bring the liquid under supercritical conditions by heating under pressure, in such a way that the boiling temperature is not exceeded at the pressure existing in the reaction vessel at any time in the treatment. The mixture is preferably kept under supercritical conditions for a period of 1 min to 8 h, especially 1 min to 4 h.

The organic liquid and the reactive substance are then removed from the pressure vessel by decompression, preferably isothermal decompression, preferably gradually by gently opening the pressure valve. Preference is given to conducting the decompression at a decompression rate in the range from 0.1 to 5 bar/min.

During the supercritical surface reaction, the formation of any great volumes of gas through uncontrolled vaporization or outgassing will preferably be prevented by means of decompression, i.e. said removal of the gas mixture via the pressure valve.

The supercritical surface reaction is preferably effected at a temperature of not more than 30° C., especially not more than 20° C., above the critical temperature of the organic liquid.

In general, the temperature is in the range from 100 to 300° C., preferably 150 to 280° C. The pressure required for this is typically in the range from 30 to 90 bar, preferably 40 to 70 bar.

If the supercritical surface reaction takes place, for example, with isopropanol as the organic liquid, a temperature of about 240 to 270° C. and a pressure of about 50 to 70 bar are generally established.

The process for subsequent surface modification may be followed by further steps. These may, for example, be steps for purification, for heat treatment and/or calcination, sieving and/or classification, compressing, bonding or immersion into active substances.

The process product obtained from the process according to the invention is the structure formed from a hard inorganic material used, the surface of which has been modified with the reactive substance. The degree of surface coverage can be determined, for example, via the carbon content determined in the elemental analysis of the structures. The carbon content determined in the surface modified hard inorganic structures is preferably in the range from 0.1 to 15% by weight, especially in the range from 1.5 to 13% by weight, based on the total mass of the surface functionalized structures.

The structure obtainable in accordance with the invention comprises an inorganic material selected from metal oxides and semimetal oxides and especially comprises, as a main constituent, at least one oxide in an amount of 90 to 100% by weight, based on the total mass of the inorganic material selected from silicon dioxide, zinc oxide, tin(IV) oxide, titanium(IV) oxide and aluminum oxide.

The inventive materials are, as described at the outset, suitable for a multitude of applications.

The examples which follow serve to illustrate the invention are should not be understood in a limiting manner.

EXAMPLES

Figure 1:
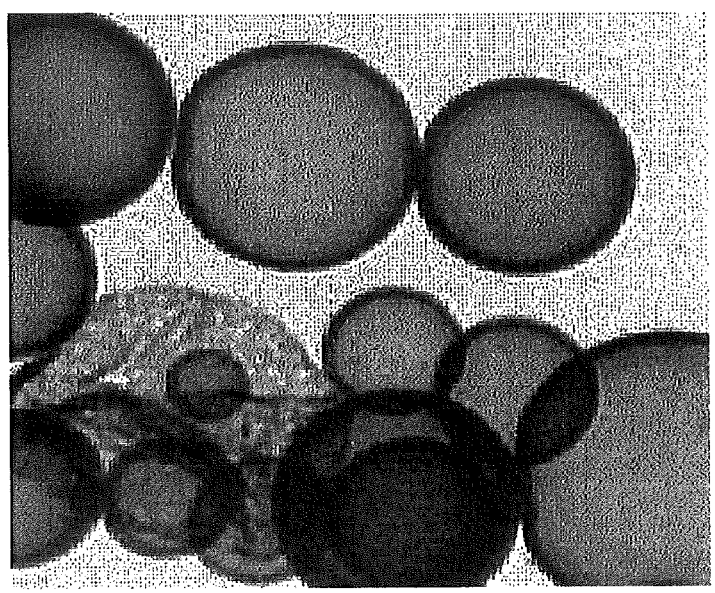
FIG. 1: TEM image of the isopropanol surface modified silicon dioxide hollow spheres from example 1.
Figure 2:
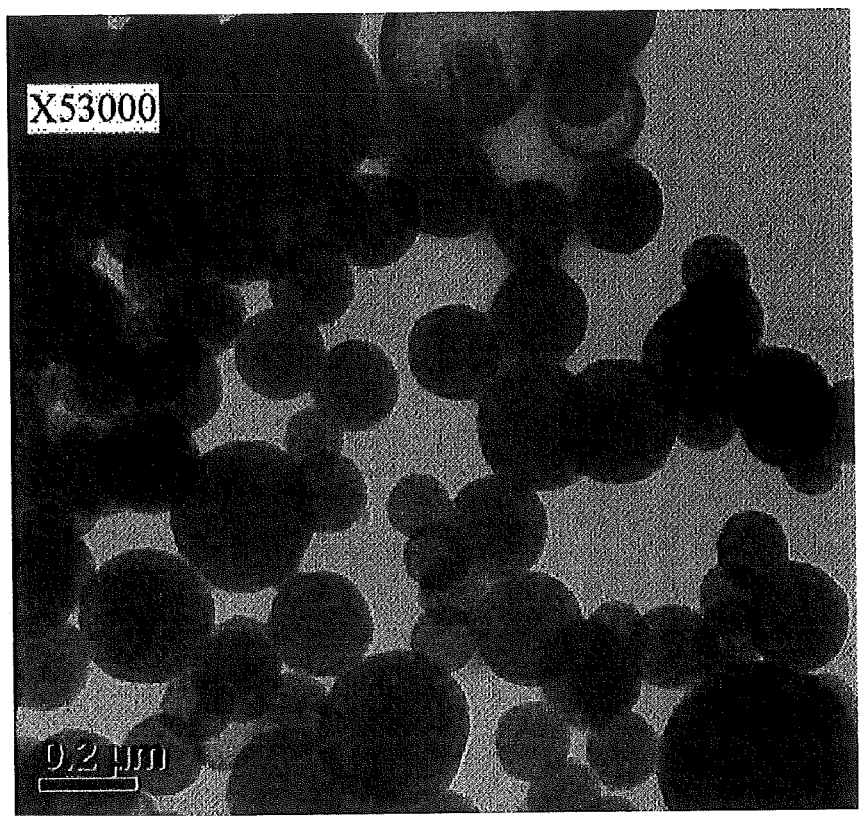
FIG. 2: TEM image of isopropanol surface modified titanium dioxide hollow spheres.

CHEMICALS USED titanium isopropoxide (>97%, from Sigma-Aldrich)
waterglass solution (techn., from Woellner)
isopropanol (99.9%, from BCD Chemie)
EO-PO block copolymer (commercially available poly(ethylene oxide-co-propylene oxide) block copolymer having a molecular weight of 4950 g/mol and a proportion of ethylene oxide of 30%)
n-decane (>99%, from Sigma-Aldrich)
ethanol (99.8%, from Sigma-Aldrich)
acetylacetone (>99%, from Sigma-Aldrich)
polyvinylpyrrolidone ($M_w$=1.3×10$^6$ g/mol; from BASF SE)
hydrochloric acid (37%, from Sigma-Aldrich)
sulfuric acid (>95%, from Sigma-Aldrich)
acetone (>98%, from Sigma-Aldrich)
oxalic acid (>98%, from Sigma-Aldrich)
malonic acid (>98%, from Sigma-Aldrich)
ethylene glycol (>98%, from Sigma-Aldrich)
glycerol (>98%, from Sigma-Aldrich)
ethylene carbonate (>98%, from Sigma-Aldrich)
n-hexane (>98%, from Sigma-Aldrich)

Analysis:

Microscope Determination of Particle Sizes and Structure Morphologies:

Transmission electron microscopy (TEM): FEI Tecnai, 200 kV

Light microscopy: Olympus BX 60, camera: Colour View Olympus U-SPT

Scanning electron microscopy (SEM): Ultra 55, 5 kV, from Zeiss

Other Analytical Methods:

Elemental analysis (determination of the carbon content of the samples as a measure of the success of the surface reaction): vario MICRO cube (from Elementar, CHN operating mode at 1000° C.)

Determination of nitrogen adsorption according to BET (determination of specific surface area) at a temperature of −196° C. to DIN ISO 9277

Determination of bulk density to ISO 3944

Contact angle measurements to DIN 55660

The degree of destruction of the structures was assessed visually by means of light or electron microscopy. The surface modified structures obtained by the process according to the invention in all examples had a degree of destruction of less than 15%, based on the total number of structures used for surface modification.

Preparation Example 1 (Hollow Spheres of Silicon Dioxide)

0.3 g of EO-PO block copolymer was dissolved in 48 g of demineralized water, and 6 g of n-decane were added while stirring. The reaction mixture was treated in an ultrasound bath for 30 min, until dispersion was accomplished. 90 mL of a 2.36% aqueous waterglass solution were introduced into a vessel heated to 60° C., and the pH was adjusted to pH 8 by addition of 1 M HCl. After a reaction time of 12.5 h, the mixture was filtered through a glass frit with pore size 0.45 µm and the filter residue was washed repeatedly with demineralized water and ethanol. The product was dried at 25° C. under vacuum conditions for several hours.

This gave hollow silicon dioxide spheres having an average diameter of about 500 µm. The specific surface area of the hollow spheres was about 60 to 80 m$^2$/g. The carbon content of the hollow spheres was less than 0.1% by weight.

Example 1 (Surface Modification of the Hollow Silicon Dioxide Spheres from Preparation Example 1)

50 g of the hollow silicon dioxide spheres from preparation example 1 were introduced with 2 L of isopropanol into a heatable stainless steel (RA4) pressure vessel having an internal sieve basket and a capacity of 20 L. The reaction mixture was heated to 270° C. within 5 h, in the course of which the pressure was limited to 70 bar. Thereafter, the reaction mixture was decompressed isothermally within 90 min. The cooled product was removed and dried at 70° C. and 0.2 bar for about 2 h.

This gave surface modified hollow spheres having a particle size distribution of about 0.1 to 8 mm. The average diameter of the hollow spheres was about 450 to 500 µm. The specific surface area of the hollow spheres was about 60 to 70 m$^2$/g. The carbon content of the hollow spheres was about 0.8% by weight. The hollow spheres were hydrophobic with a contact angle of 140°.

A TEM image of the resulting hollow spheres is shown in FIG. 1.

Preparation Example 2 (Nanofibers of Titanium Dioxide)

The preparation was based on the method according to D. Li, Y. Xia, Nano Lett. 2003, 3, 555-560.

A mixture of 30 g of titanium isopropoxide, 60 mL of ethanol, 60 mL of dilute acetic acid and 20 g of acetylacetone was prepared, a solution of 20 g of polyvinylpyrrolidone ($M_w$=1.3×10$^6$ g/mol) in 150 mL of ethanol was added and the reaction mixture was stirred for 1 h. The solution was introduced into an electrospinning device and spun at a voltage of about 50 kV. The electrode separation was 25 cm. The nanofibers formed were dried at 150° C. for 2 h and calcined to remove the polyvinylpyrrolidone at 550° C. for 2 h.

This gave titanium dioxide nanofibers having an average diameter of about 300 to 500 nm and a mean length of more than 100 µm, determined by means of light microscopy and scanning electron microscopy. The carbon content of the nanofibers was less than 0.1% by weight.

Example 2 (Surface Modification of the Titanium Dioxide Nanofibers from Preparation Example 2)

The surface modification was effected in the same way as in example 1. The starting material used was 20 g of titanium dioxide nanofibers from preparation example 2.

This gave surface modified nanofibers having about the same dimensions as the unmodified nanofibers. The carbon content of the nanofibers after the surface modification was about 0.4% by weight.

Figure 3:
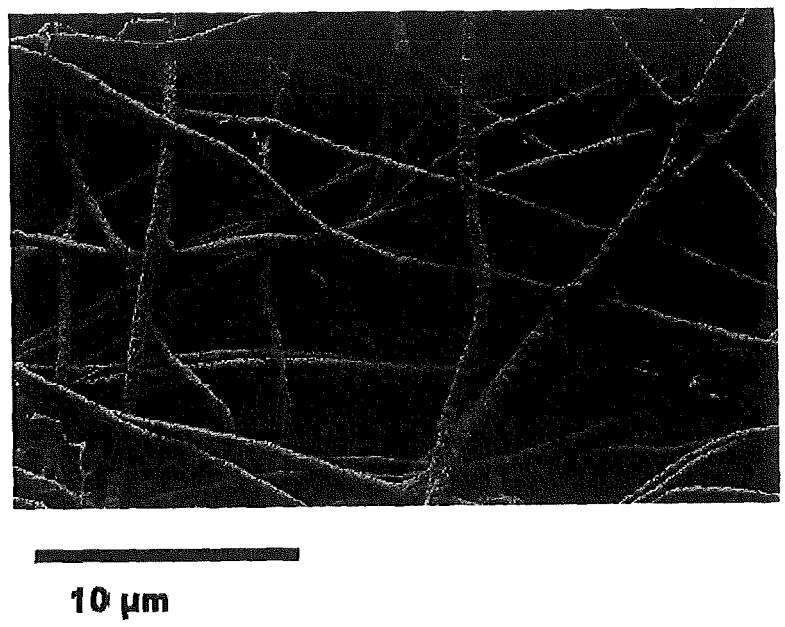
FIG. 3: SEM image of the isopropanol surface modified titanium dioxide nanofibers from example 2.

An SEM image of the resulting nanofibers is shown in FIG. 3.

Preparation Example 3 (Silicon Dioxide Nanoparticle Agglomerates)

In a mixing chamber, 2 L of 13% by weight technical waterglass solution and 1 L of 23% by weight sulfuric acid were combined. The sol formed by the neutralization of the waterglass solution was sprayed through a nozzle of diameter 2 mm. As it flew through the air, the liquid jet separated into individual droplets which, before arriving in a water basin, gelated and solidified to give transparent, mechanically stable spheres which agglomerated to give nanoparticle agglomerates. The nanoparticle agglomerates were washed with demineralized water until the wash liquid flowing away had an electrical conductivity of about 150 μS/cm. Then the water present in the nanoparticles was exchanged for isopropanol. To this end, 1 kg of the silicon dioxide nanoparticle agglomerates were introduced into a vessel of capacity 5 L, which was filled completely with isopropanol. At 25° C., isopropanol was pumped through the vessel until the water content of the isopropanol flowing away was less than 0.1% by volume. This required about 5 L of isopropanol. The silicon dioxide nanoparticle agglomerates were separated by filtration from the liquid phase.

This gave silicon dioxide nanoparticle agglomerates having an average agglomerate diameter of about 1 to 8 mm and an average diameter of the primary nanoparticles of about 1 to 20 nm, determined by means of light microscopy and scanning electron microscopy. The bulk density of the silicon dioxide nanoparticle agglomerates was 750 g/L at solids content 13% (water content 87% by weight), corresponding to a bulk density of the pure solid of about 100 g/L with unchanged volume. The carbon content of the silicon dioxide nanoparticle agglomerates was less than 0.1% by weight.

Example 3 (Surface Modification of the Silicon Dioxide Nanoparticle Agglomerates from Preparation Example 3)

The surface modification was effected in the same way as in example 1. The starting material used was 500 g of isopropanol-containing silicon dioxide nanoparticle agglomerates from preparation example 3. The amount of isopropanol added was 3 L.

This gave surface modified silicon dioxide nanoparticle agglomerates having about the same dimensions as the unmodified silicon dioxide nanoparticle agglomerates. The bulk density of the resulting agglomerates was about 110 g/L. The specific surface area of the agglomerates was about 300 to 400 m$^2$/g. The carbon content of the agglomerates was about 6% by weight. The agglomerates were hydrophobic with a contact angle of 145°.

Figure 4:
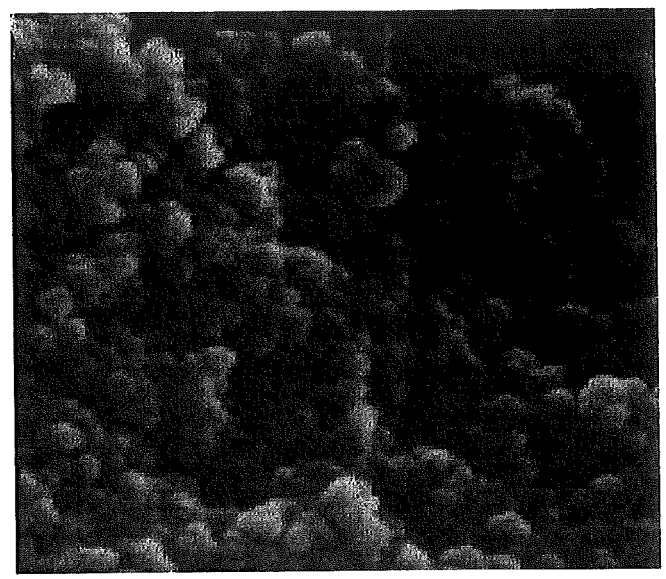
FIG. 4: SEM image of the isopropanol surface modified silicon dioxide nanoparticle agglomerates from example 3 (section from the agglomerate surface).

An SEM image of the resulting nanoparticle agglomerates is shown in FIG. 4.

Comparative Example 1 (Hollow Silicon Dioxide Spheres from Preparation Example 1 with Isopropanol Under Subcritical Conditions)

50 g of the hollow silicon dioxide spheres from preparation example 1 were introduced together with 2 L of isopropanol into a glass flask and the mixture was heated to reflux at ambient pressure for 5 h. The mixture was cooled and the product was withdrawn. The product was dried at 70° C. and 0.2 bar for about 2 h.

An assessment of the TEM images of the product showed that a majority of the hollow silicon dioxide spheres had been destroyed. The specific surface area of the product was 35 to 40 m$^2$/g. The carbon content of the product was about 0.2% by weight. The product formed was hydrophilic with a contact angle much less than 90°.

Comparative Example 2 (Titanium Dioxide Nanofibers from Preparation Example 2 with Isopropanol Under Subcritical Conditions)

20 g of the titanium dioxide nanofibers from preparation example 2 were introduced together with 2 L of isopropanol into a glass flask and the mixture was heated to reflux at ambient pressure for 5 h. The mixture was cooled and the product was withdrawn. The product was dried at 70° C. and 0.2 bar for about 2 h.

An assessment of the TEM images of the product showed that a majority of the titanium dioxide nanofibers had been destroyed. The carbon content of the product was about 0.2% by weight.

Comparative Example 3 (Silicon Dioxide Nanoparticle Agglomerates from Preparation Example 3 with Isopropanol Under Subcritical Conditions)

500 g of isopropanol-comprising silicon dioxide nanoparticle agglomerates from preparation example 3 were introduced together with 3 L of isopropanol into a glass flask and the mixture was heated to reflux at ambient pressure for 5 h. The mixture was cooled and the product was withdrawn. The product was dried at 70° C. and 0.2 bar for about 2 h.

An assessment of the TEM images of the product showed that a majority of the silicon dioxide nanoparticle agglomerates had been destroyed. More particularly, no porous nanoparticle agglomerates were apparent any longer, but instead highly compacted structures, many micrometers in size, composed of nanoparticles which had a low pore volume. The specific surface area of the product was 200 to 250 m$^2$/g. The carbon content of the product was about 0.5% by weight. The product formed was hydrophilic with a contact angle much less than 90°.

Example 4 (Surface Modification of the Hollow Silicon Dioxide Spheres from Preparation Example 1)

50 g of the hollow silicon dioxide spheres from preparation example 1 together with 2 L of a mixture of isopropanol with n-hexane (volume ratio 1:1) were introduced into a heatable stainless steel (RA4) pressure vessel having an internal sieve basket and a capacity of 20 L. The reaction mixture was heated to 270° C. within 5 h, in the course of which the pressure was limited to 50 bar. Thereafter, the reaction mixture was decompressed isothermally within 90 min. The cooled product was withdrawn and subjected to further drying at 70° C. and 0.2 bar for about 2 h.

Surface-modified hollow spheres were obtained with a particle size distribution from about 0.1 to 8 mm. The average diameter of the hollow spheres was about 450 to 500 μm. The specific surface area of the hollow spheres was about 60 to 65 m$^2$/g. The carbon content of the hollow spheres was about 0.7% by weight. The product formed was hydrophobic with a contact angle of about 130 to 140°.

Example 5 (Surface Modification of the Hollow Silicon Dioxide Spheres from Preparation Example 1)

50 g of the hollow silicon dioxide spheres from preparation example 1 together with 2 L of a mixture of ethanol with n-hexane (volume ratio 3:7) were introduced into a heatable stainless steel (RA4) pressure vessel having an internal sieve basket and a capacity of 20 L. The reaction mixture was heated to 270° C. within 5 h, in the course of which the pressure was limited to 70 bar. Thereafter, the reaction mixture was decompressed isothermally within 90 min. The cooled product was withdrawn and subjected to further drying at 70° C. and 0.2 bar for about 2 h.

Surface-modified hollow spheres were obtained with a particle size distribution from about 0.1 to 8 mm. The average diameter of the hollow spheres was about 450 to 500 µm. The specific surface area of the hollow spheres was about 55 to 65 m$^2$/g. The carbon content of the hollow spheres was about 0.8% by weight. The product formed was hydrophobic with a contact angle of about 120°.

Example 6 (Surface Modification of the Hollow Silicon Dioxide Spheres from Preparation Example 1)

50 g of the hollow silicon dioxide spheres from preparation example 1 together with 2 L of a mixture of ethanol with acetone (volume ratio 1:1) were introduced into a heatable stainless steel (RA4) pressure vessel having an internal sieve basket and a capacity of 20 L. The reaction mixture was heated to 270° C. within 5 h, in the course of which the pressure was limited to 70 bar. Thereafter, the reaction mixture was decompressed isothermally within 90 min. The cooled product was withdrawn and subjected to further drying at 70° C. and 0.2 bar for about 2 h.

Surface-modified hollow spheres were obtained with a particle size distribution from about 0.1 to 8 mm. The average diameter of the hollow spheres was about 350 to 450 µm. The specific surface area of the hollow spheres was about 35 to 65 m$^2$/g. The carbon content of the hollow spheres was about 0.6% by weight.

Example 7 (Surface Modification of the Titanium Dioxide Nanofibers from Preparation Example 2)

20 g of the titanium dioxide nanofibers from preparation example 2 together with 2 L of ethanol were introduced into a heatable stainless steel (RA4) pressure vessel having an internal sieve basket and a capacity of 20 L. The reaction mixture was heated to 270° C. within 5 h, in the course of which the pressure was limited to 70 bar. Thereafter, the reaction mixture was decompressed isothermally within 90 min. The cooled product was withdrawn and subjected to further drying at 70° C. and 0.2 bar for about 2 h.

Surface-modified nanofibers were obtained with about the same dimensions as the unmodified nanofibers. The carbon content of the nanofibers after the surface modification was about 0.7% by weight.

Example 8 (Surface Modification of the Titanium Dioxide Nanofibers from Preparation Example 2)

20 g of the titanium dioxide nanofibers from preparation example 2 together with 2 L of a mixture of ethanol with oxalic acid (volume ratio 94:6) were introduced into a heatable stainless steel (RA4) pressure vessel having an internal sieve basket and a capacity of 20 L. The reaction mixture was heated to 270° C. within 5 h, in the course of which the pressure was limited to 70 bar. Thereafter, the reaction mixture was decompressed isothermally within 90 min. The cooled product was withdrawn and subjected to further drying at 70° C. and 0.2 bar for about 2 h.

Surface-modified nanofibers were obtained with about the same dimensions as the unmodified nanofibers. The carbon content of the nanofibers after the surface modification was about 0.8% by weight.

Example 9 (Surface Modification of the Titanium Dioxide Nanofibers from Preparation Example 2)

20 g of the titanium dioxide nanofibers from preparation example 2 together with 2 L of a mixture of ethanol with malonic acid (volume ratio 95:5) were introduced into a heatable stainless steel (RA4) pressure vessel having an internal sieve basket and a capacity of 20 L. The reaction mixture was heated to 270° C. within 5 h, in the course of which the pressure was limited to 70 bar. Thereafter, the reaction mixture was decompressed isothermally within 90 min. The cooled product was withdrawn and subjected to further drying at 70° C. and 0.2 bar for about 2 h.

Surface-modified nanofibers were obtained with about the same dimensions as the unmodified nanofibers. The carbon content of the nanofibers after the surface modification was about 0.6% by weight.

Example 10 (Surface Modification of the Silicon Dioxide Nanoparticle Agglomerates from Preparation Example 3)

500 g of the isopropanol-comprising silicon dioxide nanoparticle agglomerates from preparation example 3 together with 2 L of a mixture of isopropanol with n-hexane (volume ratio 5:95) were introduced into a heatable stainless steel (RA4) pressure vessel having an internal sieve basket and a capacity of 20 L. The reaction mixture was heated to 240° C. within 5 h, in the course of which the pressure was limited to 30 bar.

Thereafter, the reaction mixture was decompressed isothermally within 90 min. The cooled product was withdrawn and subjected to further drying at 70° C. and 0.2 bar for about 2 h.

Surface-modified silicon dioxide nanoparticle agglomerates were obtained with about the same dimensions as the unmodified silicon dioxide nanoparticle agglomerates. The bulk density of the agglomerates obtained was about 100 g/L. The specific surface area of the agglomerates was about 400 to 500 m$^2$/g. The carbon content of the agglomerates was about 2.5% by weight. The product formed was hydrophobic with a contact angle of about 120°.

Example 11 (Surface Modification of the Silicon Dioxide Nanoparticle Agglomerates from Preparation Example 3)

500 g of the isopropanol-comprising silicon dioxide nanoparticle agglomerates from preparation example 3 together with 2 L of a mixture of ethylene glycol with n-hexane (volume ratio 1:9) were introduced into a heatable stainless steel (RA4) pressure vessel having an internal sieve basket and a capacity of 20 L. The reaction mixture was heated to 240° C. within 5 h, in the course of which the pressure was limited to 30 bar. Thereafter, the reaction mixture was decompressed isothermally within 90 min. The cooled product was withdrawn and subjected to further drying at 70° C. and 0.2 bar for about 2 h.

Surface-modified silicon dioxide nanoparticle agglomerates were obtained with about the same dimensions as the unmodified silicon dioxide nanoparticle agglomerates. The bulk density of the agglomerates obtained was about 105 g/L. The specific surface area of the agglomerates was about 300 to 400 m²/g. The carbon content of the agglomerates was about 6% by weight. The product formed was hydrophobic with a contact angle of about 135°.

Example 12 (Surface Modification of the Silicon Dioxide Nanoparticle Agglomerates from Preparation Example 3)

500 g of the isopropanol-comprising silicon dioxide nanoparticle agglomerates from preparation example 3 together with 2 L of a mixture of glycerol with n-hexane (volume ratio 15:85) were introduced into a heatable stainless steel (RA4) pressure vessel having an internal sieve basket and a capacity of 20 L. The reaction mixture was heated to 240° C. within 5 h, in the course of which the pressure was limited to 30 bar.

Thereafter, the reaction mixture was decompressed isothermally within 90 min. The cooled product was withdrawn and subjected to further drying at 70° C. and 0.2 bar for about 2 h.

Surface-modified silicon dioxide nanoparticle agglomerates were obtained with about the same dimensions as the unmodified silicon dioxide nanoparticle agglomerates. The bulk density of the agglomerates obtained was about 105 g/L. The specific surface area of the agglomerates was about 300 to 400 m²/g. The carbon content of the agglomerates was about 4% by weight.

Example 13 (Surface Modification of the Silicon Dioxide Nanoparticle Agglomerates from Preparation Example)

500 g of the isopropanol-comprising silicon dioxide nanoparticle agglomerates from preparation example 3 together with 2 L of a mixture of isopropanol with ethylene carbonate (volume ratio 3:1) were introduced into a heatable stainless steel (RA4) pressure vessel having an internal sieve basket and a capacity of 20 L. The reaction mixture was heated to 270° C. within 5 h, in the course of which the pressure was limited to 70 bar. Thereafter, the reaction mixture was decompressed isothermally within 90 min. The cooled product was withdrawn and subjected to further drying at 70° C. and 0.2 bar for about 2 h.

Surface-modified silicon dioxide nanoparticle agglomerates were obtained with about the same dimensions as the unmodified silicon dioxide nanoparticle agglomerates. The bulk density of the agglomerates obtained was about 110 g/L. The specific surface area of the agglomerates was about 300 to 400 m²/g. The carbon content of the agglomerates was about 7% by weight. The product formed was hydrophobic with a contact angle of about 150°.

Example 14 (Surface Modification of the Silicon Dioxide Nanoparticle Agglomerates from Preparation Example 3)

500 g of the isopropanol-comprising silicon dioxide nanoparticle agglomerates from preparation example 3 together with 2 L of a mixture of ethylene carbonate with n-hexane (volume ratio 1:3) were introduced into a heatable stainless steel (RA4) pressure vessel having an internal sieve basket and a capacity of 20 L. The reaction mixture was heated to 270° C. within 5 h, in the course of which the pressure was limited to 70 bar. Thereafter, the reaction mixture was decompressed isothermally within 90 min. The cooled product was withdrawn and subjected to further drying at 70° C. and 0.2 bar for about 2 h.

Surface-modified silicon dioxide nanoparticle agglomerates were obtained with about the same dimensions as the unmodified silicon dioxide nanoparticle agglomerates. The bulk density of the agglomerates obtained was about 110 g/L. The specific surface area of the agglomerates was about 300 to 400 m²/g. The carbon content of the agglomerates was about 1.5% by weight. The product formed was hydrophobic with a contact angle of about 120 to 130°.

Example 15 (Surface Modification of the Silicon Dioxide Nanoparticle Agglomerates from Preparation Example 3)

500 g of the isopropanol-comprising silicon dioxide nanoparticle agglomerates from preparation example 3 together with 2 L of a mixture of isopropanol with acetone (volume ratio 1:1) were introduced into a heatable stainless steel (RA4) pressure vessel having an internal sieve basket and a capacity of 20 L. The reaction mixture was heated to 270° C. within 5 h, in the course of which the pressure was limited to 50 bar. Thereafter, the reaction mixture was decompressed isothermally within 90 min. The cooled product was withdrawn and subjected to further drying at 70° C. and 0.2 bar for about 2 h.

Surface-modified silicon dioxide nanoparticle agglomerates were obtained with about the same dimensions as the unmodified silicon dioxide nanoparticle agglomerates. The bulk density of the agglomerates obtained was about 135 g/L. The specific surface area of the agglomerates was about 200 to 250 m²/g. The carbon content of the agglomerates was about 5% by weight.

The invention claimed is:
1. A process comprising:
a) providing a structure formed from a hard inorganic material, the structure having, in at least one spatial direction, a material thickness M of not more than 1000 nm and as an overall structure having, in at least one spatial direction, a measurement which is at least 5 times the material thickness M; and
b) subsequently treating the structure provided in step a) with an organic liquid comprising at least one reactive substance which can react with atoms of the inorganic material to form a chemical bond and having at least one reactive functional group selected from the group consisting of hydroxyl groups, carboxyl groups, carbonate groups, and oxygen atoms bonded to phosphorus atoms, the treating being effected under conditions under which the organic liquid is under supercritical conditions, resulting in a surface modification of the structure, wherein the treating comprises introducing the structure under subcritical conditions into the organic liquid and then heating to bring the organic liquid to the supercritical conditions,
wherein the structure is selected from the group consisting of:
i. hollow spheres, the sphere shell of which has a thickness of not more than 100 nm, and wherein the ratio of sphere diameter to thickness of the sphere shell is at least 5;
ii. fibers having a fiber thickness of not more than 1000 nm, and an aspect ratio of at least 50;
iii. platelets having a thickness of not more than 100 nm and a ratio of diameter to thickness of at least 5; and iv. agglomerates of particles having a mean particle diameter of not more than 100 nm, the proportion by volume of the inorganic material, based on the total volume of the agglomerate, being in the range from 1 to 20% by volume;

wherein the inorganic material is selected from metal oxides and semimetal oxides and has a Mohs hardness of greater than 4 and comprises at least one oxide selected from the group consisting of silicon dioxide, zinc oxide, tin(IV) oxide, titanium(IV) oxide and aluminum oxide in an amount of 90 to 100% by weight, based on the total weight of the inorganic material, and wherein the reactive substance is selected from the group consisting of $C_1$-$C_6$-alkanols, $C_1$-$C_6$-alkanecarboxylic acids, $C_2$-$C_6$-alkanepolycarboxylic acids, $C_2$-$C_6$-alkanepolyols, $C_2$-$C_4$-alkylene carbonates and mixtures thereof.

2. The process according to claim 1, wherein the overall structure has, in at least one spatial direction, a measurement in the range from 10 µm to 10 cm.

3. The process according to claim 1, wherein the organic liquid at standard pressure has a boiling point in the range from 10 to 100° C.

4. The process according to claim 1, wherein the organic liquid has a critical temperature $T_c$ in the range from 110 to 300° C.

5. The process according to claim 1, wherein the organic liquid is the reactive substance or a solution of the reactive substance in an inert organic solvent.

6. The process according to claim 1, wherein the organic liquid is a solution of the reactive substance in an inert organic solvent which has a boiling point at standard pressure in the range from 10 to 100° C.

7. The process according to claim 1, wherein the organic liquid is selected from the group consisting of $C_1$-$C_4$-alkanols, mixtures of at least two $C_1$-$C_4$-alkanols and mixtures of at least one $C_1$-$C_4$-alkanol with at least one further reactive substance selected from the group consisting of $C_2$-$C_6$-alkanepolyols, $C_2$-$C_4$-alkylene carbonates and $C_2$-$C_6$-alkanepolycarboxylic acids.

8. The process according to claim 1, wherein the treatment under supercritical conditions is effected at a temperature of not more than 30° C. above the critical temperature of the liquid.

9. The process according to claim 1, wherein the structure is selected from the group consisting of:
   i. hollow spheres, the sphere shell of which has a thickness of 2 to 50 nm, and wherein the ratio of sphere diameter to thickness of the sphere shell is at least 5;
   ii. fibers having a fiber thickness of 50 to 500 nm, and an aspect ratio of at least 100;
   iii. platelets having a thickness of not more than 100 nm and a ratio of diameter to thickness of at least 10; and
   iv. agglomerates of particles having a mean particle diameter of 2 to 80 nm, the proportion by volume of the inorganic material, based on the total volume of the agglomerate, being in the range from 1 to 20% by volume.

\* \* \* \* \*